Figure 1A:
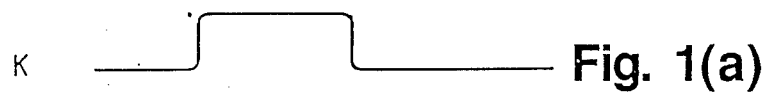
Figure 1B:
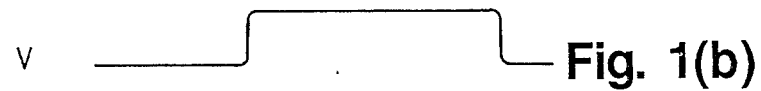
Figure 1C:
Figure 1D:
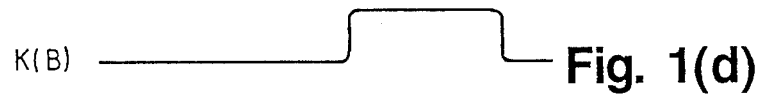
Figure 1E:
Figure 1F:
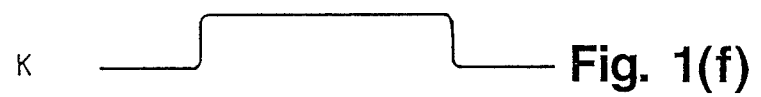
Figure 1G:
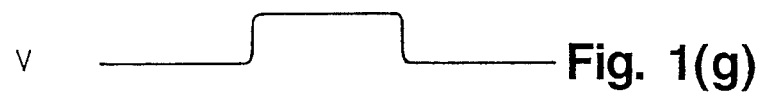
Figure 1H:
Figure 1I:
Figure 1J:

United States Patent [19]

Snashall et al.

[11] Patent Number: 4,951,145
[45] Date of Patent: Aug. 21, 1990

[54] METHOD AND APPARATUS FOR KEYING TV SIGNALS

[75] Inventors: Martin G. Snashall, Reading; Mark R. Andrews, Northampton; David F. Levy, Andover, all of United Kingdom

[73] Assignee: Abekas Video Systems Limited, United Kingdom

[21] Appl. No.: 407,267

[22] Filed: Sep. 14, 1989

[30] Foreign Application Priority Data

Sep. 21, 1988 [GB] United Kingdom ................. 8822163

[51] Int. Cl.⁵ ....................... H04N 5/272; H04N 5/14; H04N 9/74
[52] U.S. Cl. ...................................... 358/183; 358/22; 358/160; 340/723
[58] Field of Search ................. 258/22, 183, 160, 181; 340/723

[56] References Cited

U.S. PATENT DOCUMENTS

| | | | |
|---|---|---|---|
| 4,356,512 | 10/1982 | Robers | 358/183 |
| 4,589,013 | 5/1986 | Vlahos et al. | 358/22 |
| 4,694,344 | 9/1987 | Flora | 358/183 |
| 4,758,892 | 7/1988 | Bloomfield | 358/183 |
| 4,774,507 | 9/1988 | Kashigi et al. | 358/22 |
| 4,873,568 | 10/1989 | Jackson et al. | 358/183 |

Primary Examiner—John K. Peng
Attorney, Agent, or Firm—Silverman, Cass & Singer, Ltd.

[57] ABSTRACT

A method and apparatus for keying TV signals. A keying signal, K, is employed to create first and second modified keying signals, K(A) and K(B), which commence at independent points in time. The modified signals are compared and, as a result, a revised keying signal, R, is produced commencing at the leading edge of one modified keying signal and terminating at the trailing edge of the other. The operator selects R according to one of the two rules (i), (ii), the selection being by trial and error:

rule (i):
   if $K(A) > K(B)$ then $R = K(A)$
   if $K(A) < K(B)$ then $R = K(B)$
rule (ii) (which is the converse of rule (i)):
   if $K(A) > K(B)$ then $R = K(B)$
   if $K(A) < K(B)$ then $R = K(A)$.

In this manner, the revised keying signal R can be made to coincide with the video signal, V, to be keyed.

21 Claims, 2 Drawing Sheets

K

V

K(A)

K(B)

R

K

V

K(A)

K(B)

R

METHOD AND APPARATUS FOR KEYING TV SIGNALS

This invention relates to a method and apparatus for video signal processing and particularly for keying TV signals.

When video signals (such as colour TV signals) are keyed so as to overlay one scene within another, the key signal and the video signal to be keyed should be exactly in register. If there is any disparity, then the viewer may not see all of the desired overlaid scenes or may see an unwanted border. It is not difficult for the key and video signals to be slightly out of register. The present invention is concerned with eliminating such a fault by adjusting the key signal so that it coincides with the video signal. The revision is adjusted manually in response to the operator viewing the overlaid scenes.

According to the present invention there is provided an apparatus for keying a video signal, which comprises means to receive a keying signal and for creating first and second modified keying signals, independently modified to commence at independent points in the time domain, means for logically comparing the first and second modified signals, and means responsive to said comparing means for creating a revised keying signal commencing at the leading edge of one modified keying signal and terminating at the trailing edge of the other modified keying signal.

According to the present invention there is also provided a method of keying two video signals, which comprises providing a keying signal, modifying said keying signal to provide first and second modified keying signals, independently modified to commence at independent points in the time domain, logically comparing the first and second modified signals and creating a revised keying signal commencing at the leading edge of one modified keying signal and terminating at the trailing edge of the other modified keying signal, keying first and second video signals with the revised keying signal, combining said first and second keyed video signals, and viewing said combined video signal and adjusting said modification to eliminate timing errors between the keying signal and the video signals.

Preferred features of the invention will now be described, by way of example, with reference to the accompanying drawings, wherein:

FIGS. 1(*a*) to (*j*) show waveforms for understanding of the invention, and

Figure 2:
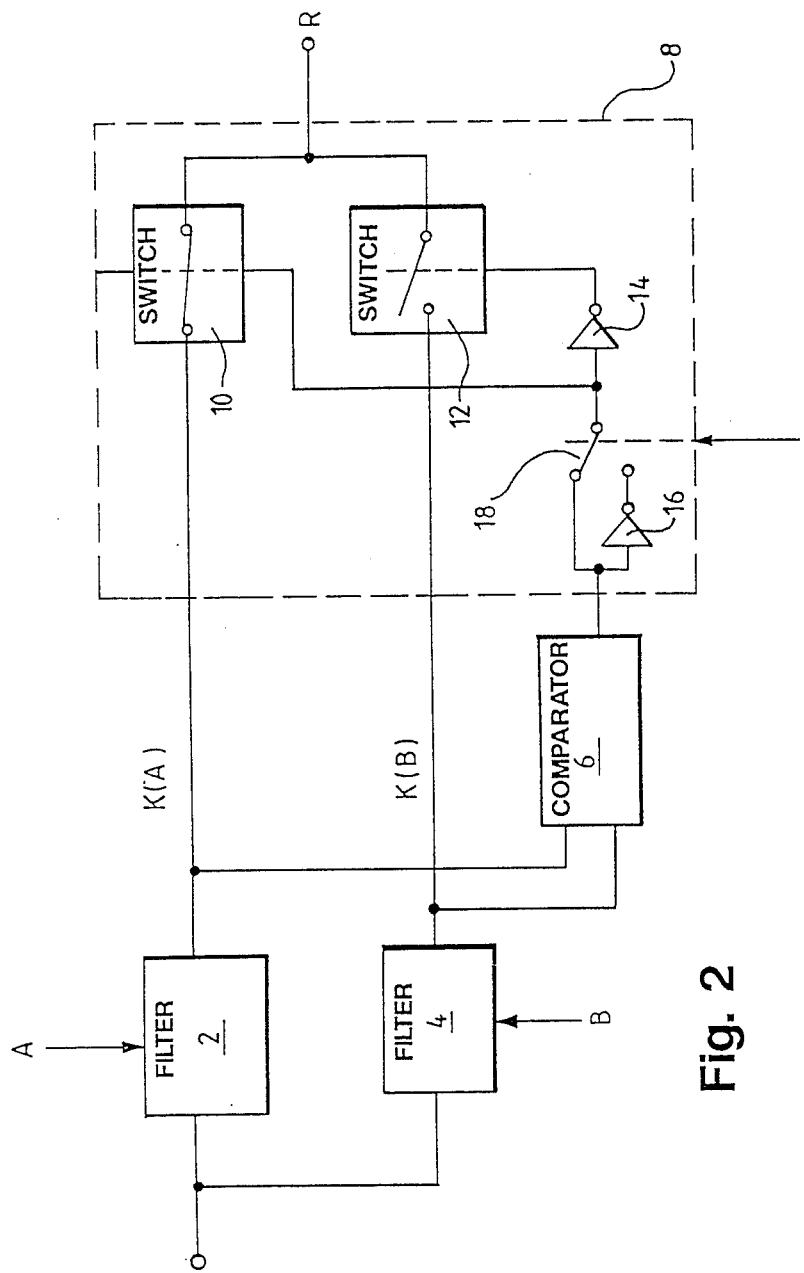

FIG. 2 is a schematic circuit diagram of a preferred apparatus according to the invention.

FIGS. 1(*a*) to (*e*) and (*f*) to (*j*) show, respectively, two separate conditions handled according to the invention.

The invention will be described with reference to the overlaying of two TV scenes—an inset "fill" scene and a "background" scene. These would be derived, respectively, from first and second video signals which are then combined with a key signal and added together. This can be expressed:

(Fill video)×(Key)+(Background video)(key̅)=Overlaid Picture

If, say, the desired fill video signal is not exactly synchronised with the key signal, a black border or picture chopping may result.

FIG. 1(*a*) shows a keying signal, K, prior to its combination with a first "fill" video signal which is to be overlaid into a corresponding gap in a second "background" video signal. The first "fill" video signal it is desired to display is depicted in FIG. 1(*b*), V, and for simplicity is shown as a simple on/off signal. The "on" periods in K and V must be exactly in register, both time-wise and extent, to provide an accurate overlaying without unwanted borders.

In FIGS. 1(*a*) and (*b*), the keying signal K commences before the video signal V and is of lesser extent. If this key was used with V, and with the second "background" video signal, a black border would appear at the left of the "fill" display. A band at the right of the "fill" would be chopped prematurely.

In FIGS. 1(*f*) and (*g*), the keying signal K is of greater extent V. This would result in left and right black borders for the "fill".

In accordance with the invention, the keying signal K is shifted spatially in time by filtering independently through two channels, A and B, so as to provide time-shifted keying signals K(A)—FIGS. 1(*c*) and 1(*h*)—and K(B)—FIGS. 1(*d*) and (*i*). The filter characteristics are adjusted independently by the operator of the equipment. The two time-shifted signals K(A), K(B) are then compared and logically combined according to the rules:

(i) If K(A)>K(B) then select K(A)

K(A)<K(B) then select K(B)

or (ii) If K(A)>K(B) then select K(B)

K(A)<K(B) then select K(A)

The logical combination according to rule (i) is shown in FIG. 1(*e*) whereas the logical combination according to rule (ii) is shown in FIG. 1(*j*). It will be observed in FIGS. 1(*c*) and (*h*) that K(A) has been shifted so that its leading edge coincides with the leading edge of the "on" period in the V signal. Similarly, in FIGS. 1(*d*) and (*h*), K(B) has been shifted such that its trailing edge coincides with the trailing edge of the "on" period in the V signal. It can be seen that, under such conditions, the result of taking one or other of the logical combinations given above (rule (i) or (ii))—"R" in FIGS. 1(*e*) and 1(*j*)—is to adapt the keying signal K to the correct extent of the video signal V. Signal R can then be employed as a modified key signal to key the first and second video signals.

Referring to FIG. 2, the diagram depicts a circuit showing how the modified keying signal R is obtained from the keying signal K. The apparatus consists of a pair of filters 2,4 for shifting the key signal in time. The degree of shift is controlled by the shift values A and B, which can be varied by the operator of the apparatus. The filtered signals K(A) and K(B) are compared in comparator 6 to provide a "1" output when A>B and a "0" when A<B (either a "0" or "1" is acceptable if A=B). The output of comparator 6 is used as one input to control a circuit 8 shown within the dotted lines for selecting K(A) or K(B) according to rule (i) or (ii) above.

Circuit 8 comprises two electronic switches 10,12 controlled by the output of comparator 6. An inverter 14 in the control line to switch 12 ensures that the two switches are always in opposite conditions. A further inverter 16 is coupled through a switch 18 in the control lines to switches 10,12. Switch 18 is manually under the control of the operator.

The circuit operates as follows. It will be observed that rule (ii) is the converse of rule (i). These can be brought into operation alternately depending on the position of switch 18. The operator of the circuit is simply presented with three controls: one for the value of A, one for the value of B, and switch 18. Simply by viewing the combined and keyed first and second video signals (i.e. the final overlaid scenes) the operator then adjusts A and B and selects one or other position of switch 18 until an accurately keyed "fill" video signal within the keyed "background" video signal is displayed. Although to begin with the adjustment is on a trail and error basis, an experienced operator will quickly learn how best to adjust A and B independently and which position of switch 18 to select. There is no actual need for the operator to view the waveforms illustrated in FIGS. 1(a) to (j) to achieve exact registration of the relevant signals.

The apparatus described does not operate universally for all relative values between K and V and is not intended to do so. In practice, K is generally not too different from V and the invention is intended to provide a final adjustment between them.

We claim:

1. An apparatus for keying a video signal, which comprises means to receive a keying signal and for creating first and second modified keying signals, independently modified to commence at independent points in the time domain, means for logically comparing the first and second modified signals, and means responsive to said comparing means for creating a revised keying signal commencing at the leading edge of one modified keying signal and terminating at the trailing edge of the other modified keying signal.

2. An apparatus according to claim 1 wherein said means for creating said modified keying signals comprises first and second filter means, each filter means having manually-alterable filter characteristics whereby its received signal may be modified to commence at a different point in the time domain in accordance with the input filter characteristics.

3. An apparatus according to claim 2 wherein the comparing means compares the value of one modified signal against the value of the other modified signal and provides an enabling signal to said means for creating the revised keying signal, the enabling signal being of a first or second value depending upon the result of said comparison.

4. An apparatus according to claim 2 which comprises means for keying a first video signal with said revised keying signal, means for keying a second video signal with said revised keying signal, and means for combining said first and second keyed video signals.

5. An apparatus according to claim 2 wherein said means for creating a revised keying signal does so according to the rules:

if $K(A) > K(B)$ then $R = K(A)$ $K(A) < K(B)$ then $R = K(B)$, wherein $K(A)$ and $K(B)$ are the respective modified keying signals and R is the revised keying signal.

6. An apparatus according to claim 5 which comprises means for keying a first video signal with said revised keying signal, means for keying a second video signal with said revised keying signal, and means for combining said first and second keyed video signals.

7. An apparatus according to claim 2 wherein said means for creating a revised keying signal does so according to the rules:

if $K(A) > K(B)$ then $R = K(B)B$ $K(A) < K(B)$ then $R = K(A)$, wherein $K(A)$ and $K(B)$ are the respective modified keying signals and R is the revised keying signal.

8. An apparatus according to claim 7 which comprises means for keying a first video signal with said revised keying signal, means for keying a second video signal with said revised keying signal, and means for combining said first and second keyed video signals.

9. An apparatus according to claim 1 wherein the comparing means compares the value of one modified signal against the value of the other modified signal and provides an enabling signal to said means for creating the revised keying signal, the enabling signal being of a first or second value depending upon the result of said comparison.

10. An apparatus according to claim 9 which comprises means for keying a first video signal with said revised keying signal, means for keying a second video signal with said revised keying signal, and means for combining said first and second keyed video signals.

11. An apparatus according to claim 9 wherein said means for creating a revised keying signal does so according to the rules:

if $K(A) > K(B)$ then $R = K(A)$ $K(A) < K(B)$ then $R = K(B)$, wherein $K(A)$ and $K(B)$ are the respective modified keying signals and R is the revised keying signal.

12. An apparatus according to claim 11 which comprises means for keying a first video signal with said revised keying signal, means for keying a second video signal with said revised keying signal, and means for combining said fist and second keyed video signals.

13. An apparatus according to claim 9 wherein said means for creating a revised keying signal does so according to the rules:

if $K(A) > K(B)$ then $R = K(B)$ $K(A) < K(B)$ then $R = K(A)$, wherein $K(A)$ and $K(B)$ are the respective modified keying signals and R is the revised keying signal.

14. An apparatus according to claim 13 which comprises means for keying a first video signal with said revised keying signal, means for keying a second video signal with said revised keying signal, and means for combining said fist and second keyed video signals.

15. An apparatus according to claim 1 which comprises means for keying a first video signal with said revised keying signal, means for keying a second video signal with said revised keying signal, and means for combining said first and second keyed video signals.

16. An apparatus according to claim 1, wherein said means for creating a revised keying signal does so according to the rules:

if $K(A) > K(B)$ then $R = K(A)$ $K(A) < K(B)$ then $R = K(B)$, wherein $K(A)$ and $K(B)$ are the respective modified keying signals and R is the revised keying signal.

17. An apparatus according to claim 16 which comprises means for keying a first video signal with said revised keying signal, means for keying a second video signal with said revised keying signal, and means for combining said first and second keyed video signals.

18. An apparatus according to claim 1, wherein said means for creating a revised keying signal does so according to the rules:

if $K(A) > K(B)$ then $R = K(B)$ $K(A) < K(B)$ then $R = K(A)$, wherein $K(A)$ and $K(B)$ are the respective modified keying signals and R is the revised keying signal.

19. An apparatus according to claim 18 which comprises means for keying a first video signal with said revised keying signal, means for keying a second video signal with said revised keying signal, and means for combining said first and second keyed video signals.

20. A method of keying two video signals, which comprises providing a keying signal, modifying said keying signal to provide first and second modified keying signals, independently modified to commence at independent points in the time domain, logically comparing the first and second modified signals and creating a revised keying signal commencing at the leading edge of one modified keying signal and terminating at the trailing edge of the other modified keying signal, keying first and second video signals with the revised keying signal, combining said first and second keyed video signals, and viewing said combined video signal and adjusting said modification to eliminate timing errors between the keying signal and the video signals.

21. A method according to claim 20 wherein said modifying comprises filtering said keying signal and manually-adjusting each filter's characteristics independently whereby the keying signal may be modified to commence at a different point in the time domain in accordance with the input filter characteristics.

* * * * *

UNITED STATES PATENT AND TRADEMARK OFFICE
CERTIFICATE OF CORRECTION

PATENT NO. : 4,951,145

DATED : August 21, 1990

INVENTOR(S) : Martin Gerald Snashall et al.

It is certified that error appears in the above-identified patent and that said Letters Patent is hereby corrected as shown below:

Column 3, line 15, "trail" should be --trial--;

Column 4, line 7, "if K(A) > K(B) then R = K(B)B" should be --if K(A) > K(B) then R = K(B)--

Signed and Sealed this

Tenth Day of March, 1992

Attest:

HARRY F. MANBECK, JR.

*Attesting Officer*           *Commissioner of Patents and Trademarks*